(No Model.)

W. H. DOUGHERTY.
PUNCHING MACHINE.

No. 584,773.  Patented June 22, 1897.

Witnesses
Inventor
William H. Dougherty
Attorneys (No Model.)  9 Sheets—Sheet 5.

W. H. DOUGHERTY.
PUNCHING MACHINE.

No. 584,773.  Patented June 22, 1897.

Witnesses  
Inventor  
William H. Dougherty  
by Foster & Freeman  
Attorneys

THE NORRIS PETERS CO., PHOTO-LITHO., WASHINGTON, D. C.

(No Model.)  
W. H. DOUGHERTY.  
PUNCHING MACHINE.  
9 Sheets—Sheet 6.

No. 584,773.  
Patented June 22, 1897.

Witnesses  
Inventor  
William H. Dougherty  
by  
Foster & Freeman  
Attorneys (No Model.) 9 Sheets—Sheet 7.

W. H. DOUGHERTY.
PUNCHING MACHINE.

No. 584,773. Patented June 22, 1897.

Witnesses
J. G. Hinkel

Inventor
William H. Dougherty
by Foster & Freeman
Attorneys

THE NORRIS PETERS CO., PHOTO-LITHO., WASHINGTON, D. C.

(No Model.) 9 Sheets—Sheet 8.
W. H. DOUGHERTY.
PUNCHING MACHINE.

No. 584,773. Patented June 22, 1897.

Witnesses
Inventor
Wm. H. Dougherty
Attorneys (No Model.) 9 Sheets—Sheet 9.

W. H. DOUGHERTY.
PUNCHING MACHINE.

No. 584,773. Patented June 22, 1897.

UNITED STATES PATENT OFFICE.

WILLIAM H. DOUGHERTY, OF BROOKLYN, NEW YORK, ASSIGNOR TO THE FIRM OF A. DOUGHERTY, OF NEW YORK, N. Y.

PUNCHING-MACHINE.

SPECIFICATION forming part of Letters Patent No. 584,773, dated June 22, 1897.

Application filed February 2, 1897. Serial No. 621,655. (No model.)

*To all whom it may concern:*

Be it known that I, WILLIAM H. DOUGHERTY, a citizen of the United States, residing at Brooklyn, in the county of Kings and State of New York, have invented certain new and useful Improvements in Punching-Machines, of which the following is a specification.

My invention relates to punching-machines of that character employed for punching or embossing successive portions of a strip of any material, but especially to that class of punching-machines used for punching cards from strips having successive prints constituting the printed matter of card-faces; and my invention consists of a punching-machine having a peculiar construction and arrangement of parts for controlling the movements of successive printed or embossed strips, as fully set forth hereinafter and as illustrated in the accompanying drawings, in which—

A is the base of the machine, suitably supported on legs or standards and supporting a frame B, in which frame are the bearings of the operating-shaft C, which is provided at one end with an eccentric 1, working in a cross-head 2 of a rod connected with a slide which works vertically in a guide 3 and which carries at its lower end a punch $a$, the latter reciprocating through a guide $b$ to cut cards successively from a traveling strip, as in ordinary card-cutting machines.

The strip X (dotted lines, Fig. 1) is fed over a table G upon the base A and toward the punch by means of a gripper D, of suitable construction to engage the strip transversely at opposite sides of its central line, and this gripper, when the punch is elevated, travels with the strip toward the punch for a distance sufficient to bring the prints upon the strip successively in proper position below the punch. As there are eight prints on each strip in the operations which are carried out by the machine illustrated, there are combined with the gripper devices which will cause the gripper to move successively eight times to the extent before described. Inasmuch, however, as there is at each end of each strip a blank portion much greater in length than the distance between successive prints it becomes necessary for the gripper at the end of the eighth motion to move back to a greater extent to thereby feed the following strip X' sufficiently to bring the first print thereon to coincide properly with the die. If desired, the end of the following strip X' might be brought to abut the end of the strip X and the gripper might be carried far enough back to grip the following strip and present the first print properly to the die. This, however, would render it necessary to adjust the succeeding strip into position as the last print was being cut from the first strip, and the adjustment would have to be made during the operation of the gripper, so that it would be almost impossible for the operator to get the following strip in proper position to be seized by the gripper. I therefore provide means whereby after one strip has been fed a certain distance the next strip may be placed and clamped upon the table G in proper position, with its forward end extending over the strip which is being cut, but elevated therefrom, so as to permit the operation of the gripper upon the said strip which is being cut, and I release the elevated end of the succeeding strip and let it fall into position to be seized by the gripper just as the last print is being cut from the first strip. The holder or device which supports the forward end of the succeeding strip must release this strip and be thrown down with great rapidity in order that it may be seized by the gripper, and I therefore term this holder a "flipper."

As the distance between the last print of one strip and the first print of the following strip is much greater than the distance between successive prints, it becomes necessary after the last print of each strip is cut therefrom to carry the gripper back a greater distance, so that the said gripper has two feed motions—to wit, a short feed motion, of which there are seven in succession, and a long feed motion, of which there is but a single motion at the end of each seventh short motion.

After the eighth print has been cut from strip, which is then in the form of a skeleton, it becomes desirable to get rid of the latter as speedily as possible, and I therefore make use of a supplemental feed device E, of suitable construction, which is then brought into operation to carry the skeleton rapidly away from the table.

Having described the general features of the machines and their operations, I will now refer in detail to the main devices, their construction, and the means illustrated for operating the same.

Figure 12:
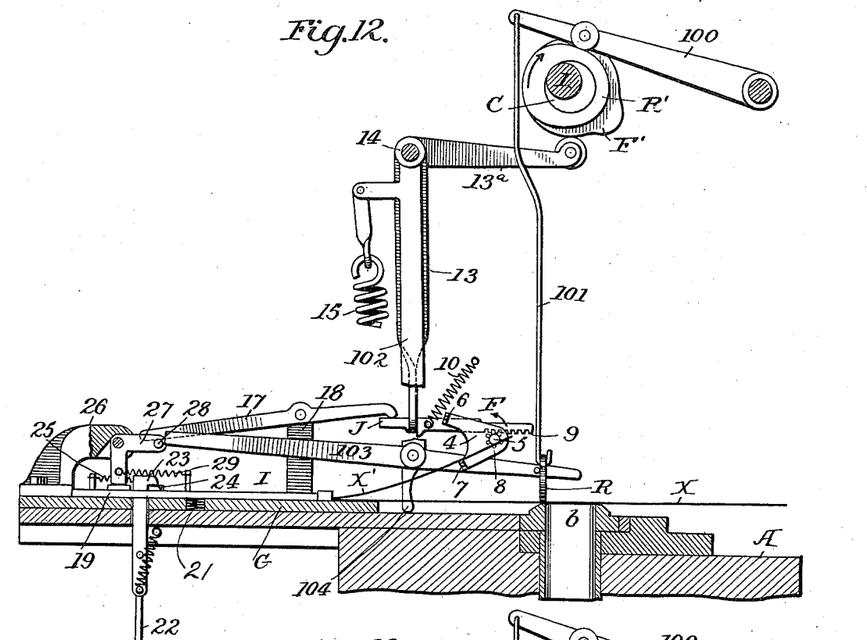
Fig. 12 is a front elevation in section through the guide, illustrating the flipper and coöperating parts.

*The flipper.*—As shown, the flipper F consists of a rocking head 4 upon a shaft 5 and provided with two arms 6 7, parallel to each other, but at different distances from the shaft. When the additional strip X', Fig. 12, is placed upon the table G, the flipper F is in the position shown in Fig. 12 and the forward end of the strip X' rests upon the arm 7 in an elevated position, which permits the gripper D to operate beneath. When the strip X has traveled forward until the last print is below the die *a*, the shaft 5 is turned quickly in the direction of its arrow, Fig. 12, bringing the flipper to the position shown in Fig. 13, the arm 7 passing from below the end of the strip X' and the arm 6 being brought smartly against the said end and throwing the strip with a quick action downward into position, so that it cannot fail to be caught on the next movement of the gripper. The flipper then at once resumes its normal position by means of spring 15, hereinafter mentioned.

The shaft 5 turns in a bearing in the frame of the machine and has a pinion 8, which engages with a rack 9 upon a bar J, which is carried in one direction by a spring 10 and which has at the lower edge a notch adapted to engage a cross-piece 12 at the end of a lever 13, secured to a stud 14, extending through the frame. Secured to the other end of the stud 14 is a lever 13$^a$, having an antifriction-roller which bears against an operating-cam F' upon the shaft C, and this shaft revolves once to each eight reciprocations of the punch, so that once in each revolution the lever 13$^a$ is vibrated and carries the bar J to the left, Fig. 13, and rocks the flipper. A spring 15 is connected with bar J and tends to maintain the end of the lever 13$^a$ in contact with the operating-cam.

It is desirable that the flipper shall not release the strip unless the latter has been clamped in proper position upon the table by the clamping device I, hereinafter described, and I therefore extend the bar J through a slot in the end of the lever 13, and so arrange the spring 10 as to normally maintain this bar elevated in said slot out of position to engage the cross-piece 12, and I provide means whereby the end of the bar will be depressed only when the clamp has been applied to clamp the strip to the table. As shown, the means consists of a lever 17, pivoted to a standard 18 and extending over the end of the bar J. The adjustment of this lever depends upon the position of the parts of the clamping device, as hereinafter described.

*The clamping device.*—The clamping device I, as shown, consists of a blade 19, extending over the table G and having trunnions at the rear end extending into ears 20 and pressed upward by a spring 21, confined in a recess in the table below the blade.

Figure 4:
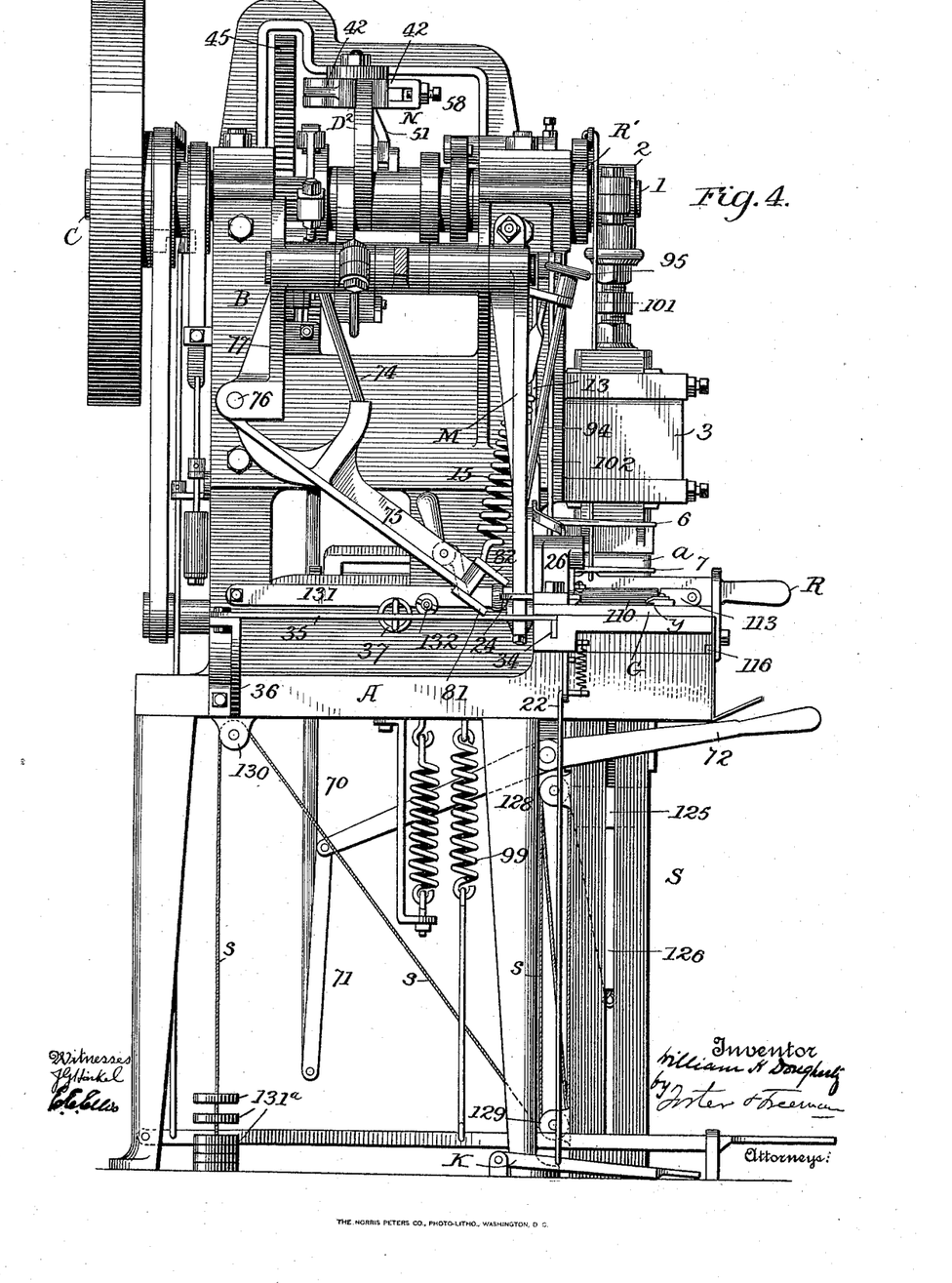
Fig. 4 is an end elevation looking in the direction of the arrow $w$, Fig. 1.
Figure 5:
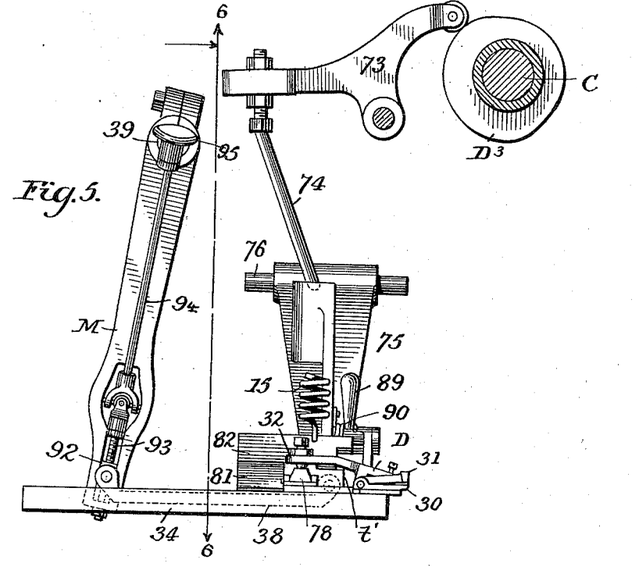
Fig. 5 is a front view of the gripper and connected parts.

The operator, after the rear edge of one strip has passed beyond the clamping device, at once passes the back edge of the following strip beneath the plate 19, Fig. 1, and after adjusting the strip by means of the gage, hereinafter described, by means of a treadle K, Fig. 4, depresses the clamping plate or blade and thereby clamps the strip firmly in position upon the table. The treadle is connected with a rod 22, which extends upward to the table and through the blade 19 and is provided with a lip 23, which normally bears upon a lever 24, pivoted to the top of the blade 19 and normally carried by a spring 25 toward the rod 22 and beneath the lip. When the strip is to be automatically released, an arm connected, as hereinafter described, with the gripper strikes the end of the lever 24, Fig. 1, and swings the latter from below the lip 23, Fig. 12, when the blade 19 can rise sufficiently to release the strip.

Figure 13:
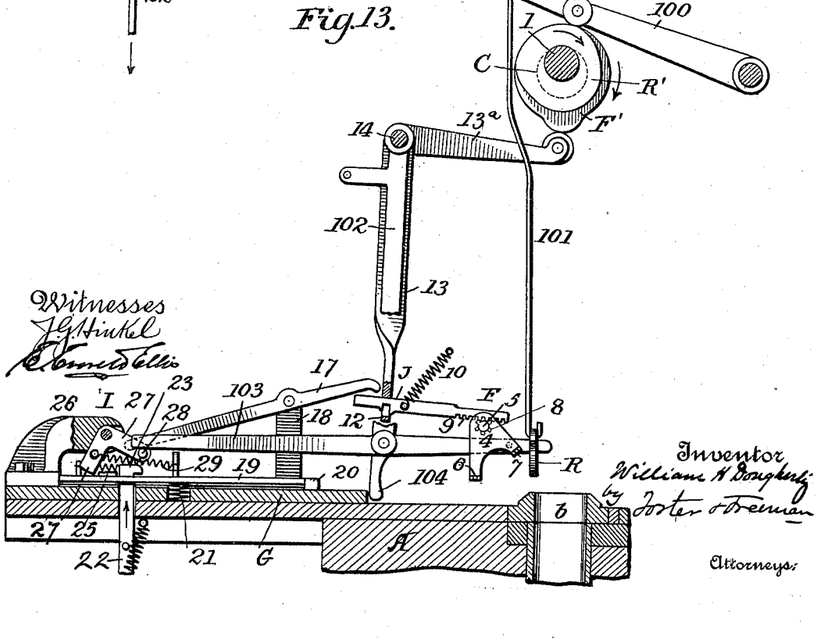
Fig. 13, the same as Fig. 12, showing the parts in different positions.

To an arm 26, extending from the table above the blade 19, is pivoted a bell-crank lever 27, at one end of which is a cross-pin 28, while a spring 29 is connected to the other end of this lever, and when the clamping-blade 19 is depressed this spring will carry the lever 27 to the position shown in Fig. 12, and the pin 28, bearing upward against the lever 17, will depress the forward end of that lever, so as to bring the notch of the bar J into engagement with the cross-piece 12, as before described. When, however, the clamping-blade 19 is not in clamping position, as shown in Fig. 13, the lever 27, by its contact with the blade, will be held in the position shown in Fig. 13, and the bar J in such case will be held upward and out of contact with the crosspiece 12, so that the flipper will not then be operated by the movement of the lever 13.

The arm 27 is restored to the position shown in Fig. 13 by the movement of the gripper, as hereinafter described.

*The gage.*—Difficulty has been experienced in cutting the cards accurately in consequence, sometimes, of slight irregularities in the printing which causes the cards to be differently spaced, and also from expansion and contraction of the paper at different times, which will sometimes amount to as much as an eighth of an inch in a single strip of eight cards. Commonly in placing such strips in the machine for feeding to the cutting-punch the gage is so arranged that the edge of the end print is taken as a starting-point. As a consequence, if there is any inaccuracy in the printing or expansion or contraction of the strip each successive cut will carry the prints farther out of position in respect to the die, so that by the time the last card has been cut, unless the strip has been adjusted, it will be considerably out of coincidence with the lines of the punch. In order to reduce the difficulties from this source as much as possible, I place the gage $e$ in such a position that when the strip is adjusted on the table the said gage will occupy a central position between the ends of the strip. As a consequence, if there are any inaccuracies whatever they are divided upon opposite sides of this center, and as a consequence will not be added to the successive cards and a more uniform result is secured.

Figure 20:
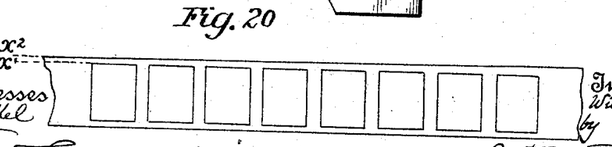
Fig. 20 is a diagram illustrating the arrangement of the prints upon the card-strips.

While the sheets upon which the cards are printed are generally cut in the first instance so that their opposite edges are parallel and at right angles to the ends, in rolling or reducing or finishing these sheets they are frequently reduced in thickness, and consequently widened more or less at the ends. As a consequence, when the strips of cards are cut therefrom it frequently happens that the margin or edges of the prints of those strips which are cut from the ends or sides of the sheet will vary in width between the line of printing and the said edge. Thus if $x'$ represents the line of the printing of the series of cards the edge $x^2$ of the sheet will be wider at one end than at the other, as shown in Fig. 20.

Heretofore the edge of the sheet has been the guide in feeding the strip to the cutter, said edge bearing against the gage, and consequently the operator on finding that the edge is at different distances from the line of the print must stop the machine and adjust the strip from time to time. In order to avoid this difficulty, I make the gage with an overhang, beneath which the edge of the strip may pass, so that the edge $y$ of the overhanging portion is in position to act as a gage, the strip being passed under this edge until the edges of the prints upon the strip coincide with the edge $y$. It then becomes unimportant whether the edge of the paper is straight or not, because this is no longer depended upon as a guide, and the strips may be fed without any necessity of stopping the machine for adjustment—that is, the edges of the successive prints constitute the guide instead of the edge of the paper or strip.

*The gripper.*—The gripper consists of two jaws 30 31, pivoted together, and in order that the strip may lie flat upon the table the jaw 30 slides beneath a slotted plate G′, constituting an extension beyond the end of the table G, the said jaw 30 having two recesses $v\ v$ to receive the parallel portions on opposite sides of the slots of the plate G′. The upper jaw 31 has an arm 32, and a spring 33 between the jaws tends to hold them normally open, while suitable devices operating on the arm 32 bring the jaws together when they are to seize the strip which passes between them and feed the same forward to the die. The lower jaw 30 is secured to an angle-bar 34, which fits a longitudinal recess in the table G and extends nearly to the end of the latter, and against the end of the bar 34 bears one end of a lever 35, pivoted at the opposite end to an arm 36 and connected with a spring 37, which is the means of carrying the bar and the gripper forward toward the die.

The gripper is connected by a link 38 with the lower end of an arm M on a rock-shaft 39, from which an arm 40 extends beneath a cam D′ upon the shaft C, which cam D′ imparts the short throw to the gripper.

Figures 14, 15, 16:
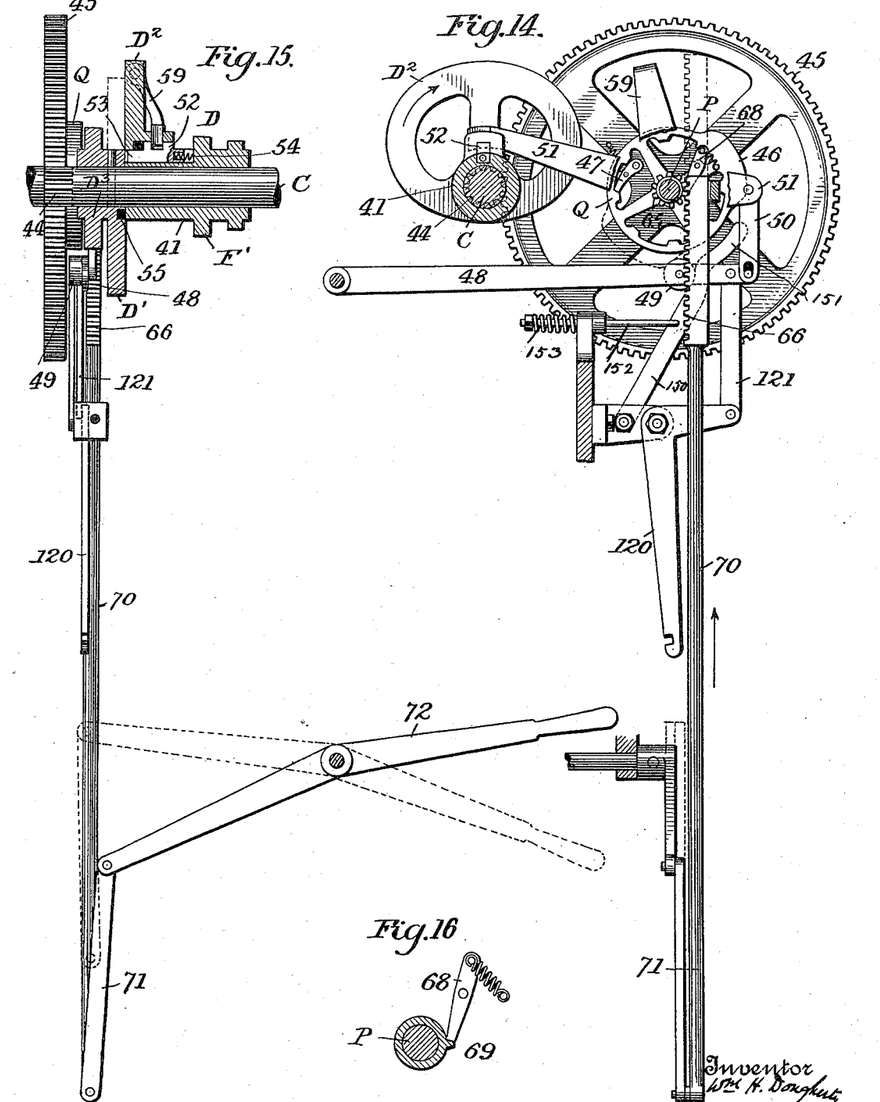
Fig. 14 is an enlarged sectional front elevation showing the parts employed for intermittently varying the action of the feed or gripper device.
Fig. 15 is a longitudinal section of the parts about the shaft, Fig. 14.
Fig. 16 is a detached view, enlarged, of part of the devices shown in Fig. 14.
Figure 17:
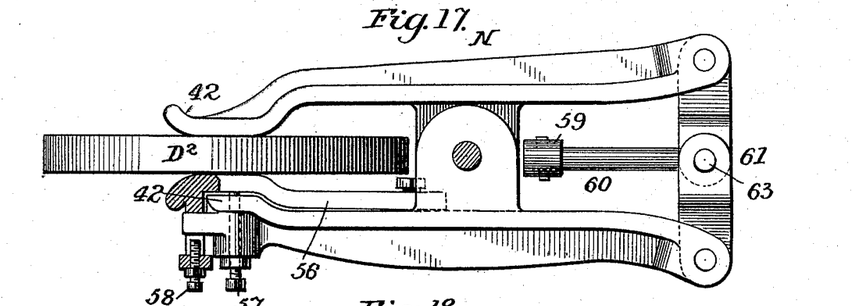
Fig. 17, an enlarged plan, in part section, of the brake device connected with the feed-operating devices.
Figure 18:
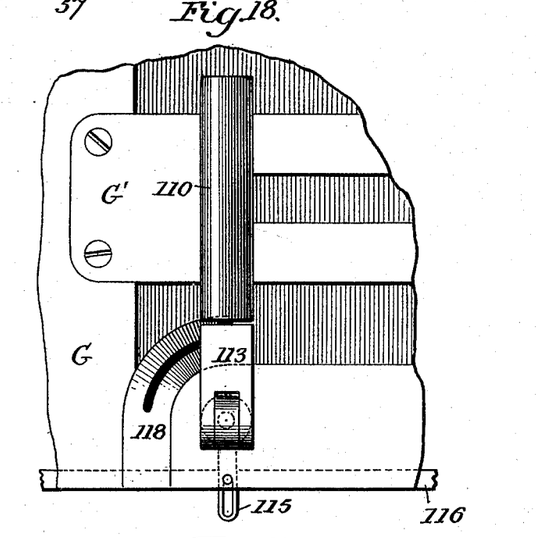
Fig. 18 is an enlarged plan of the auxiliary clamp.
Figure 19:
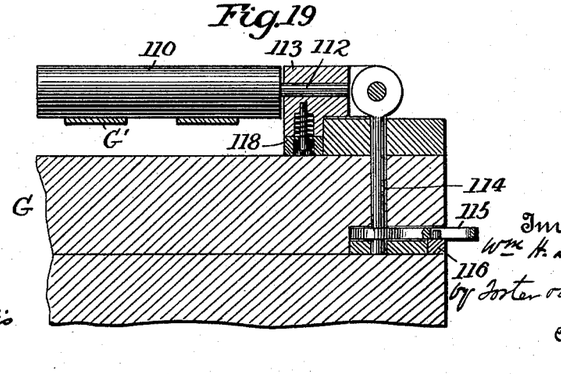
Fig. 19 is a transverse section of the parts shown in Fig. 18.

The long throw is imparted to the gripper from a cam D², which is upon a sleeve 41 upon the shaft C. Normally the cam D² is held in a stationary position between the jaws 42 42 of a brake N, so that the cam D² does not begin to turn with the shaft C until after seven short movements of the gripper the cam D′ is brought to a position coinciding with the cam D², (dotted lines, Fig. 15,) when the two cams are automatically locked together by a locking device and then turned, together with the shaft C, when the cam D² will act upon the end of the arm 40 and rock the shaft 39 and arm M, so as to carry the gripper back far enough to grip the forward end of the new strip.

The locking and unlocking of the cam D² is effected at suitable intervals as follows: A counter-shaft P is driven from the shaft C through the medium of a pinion 44 on the shaft C and a toothed wheel 45 on the shaft P, constituting gears which are proportioned as eight to one. On the shaft P is mounted a wheel Q, having a cam 46 at its periphery and having ratchet-teeth adapted to engage a spring-pawl 47, pivoted to the hub of the wheel 45. Beneath the cam-wheel Q extends a lever 48, having an antifriction-roll 49 and connected by a link 50 with a lever 51, swinging on the shaft P, and with a beveled end which extends into a slot in the sleeve 51ᵃ in position in front of a lug 52 on a bolt 53, which bears at one end against a spring 54. In the cam D' is a recess 55, adapted to receive the end of the bolt 53. When the shaft C has turned seven revolutions, the cam 46, by contact with the roller 49, will depress the lever 48 and the lever 51, so as to release the bolt 53, which, when the cam D' is brought to coincide with the cam D², will enter the notch 55, thereby locking both cams to the shaft. When the cam D² has turned with the shaft C one revolution and imparted the long throw to the gripper, the projection 52 of the bolt 53 will be brought against the beveled end of the lever 51 and will be gradually brought back until the parts are in the position shown in Fig. 14, when the bolt will be wholly withdrawn from the cam D' and the latter and the shaft will turn, while the cam D², having then entered between the jaws of the brake end, will be held in stationary position. As the shaft C in actual operation turns quite rapidly, the brake end serves to arrest the movement of the cam D² in proper position without too great a shock. In order that the brake may fit nicely to the cam D², one of the jaws is provided with an inner facing 56, with a bolt 57 for setting it nicely in position. A second bolt 58, passing through an arm extending laterally from the jaw 56, limits the movement of the jaw 56 in the opposite direction. As the friction of the brake would interfere with the ready starting of the cam D², I provide means for releasing the brake when the cam is to be started in movement. Thus an arm 59, extending from the lever 51, is connected by a rod 60 with toggle-levers 61 between the rear ends of the jaws 42 42 of the brake, and when the lever 51 is lifted to cause the cam D² to be locked to the shaft the toggles are thrown back and the jaws are opened. This action is against the stress of a spring 62, connected to the toggle-pin 63, and when the lever 51 is in its first position the said spring 62 carries in the toggles and sets the jaws in place to engage the cam D².

It sometimes happens that it is desirable to start operations upon a strip immediately after the cam D² has been brought to its stationary position, or at some time before the parts are in position, to impart the long throw to the gripper, which should occur on starting to operate with any strip. In order to avoid the necessity of turning the shaft C a number of times to bring the cam 46 into position to operate on the lever 48, I provide means for turning the cam-wheel Q forward independently of the wheel 45. Thus the shaft P is provided with a loose pinion 65 and with a pin 69 for engaging a pawl 68 on the wheel Q. A rack 66 engages the pinion 65 and may be elevated in any suitable manner to turn the cam-wheel forward until its cam 46 is in a position shown by dotted lines, Fig. 14, the pawl 47 permitting this movement by insuring the rotation of the cam-wheel with the wheel 45, as soon as the cam-wheel is turned to its proper position. The rack 66 is upon a rod 70, connected by a link 71 with a hand-lever 72, by means of which the rack may be raised.

T is a spring-brake device or mechanism comprising a frame having an inclined portion 150, terminating at its upper end with a curved branch 151, and said portion 150 is connected with the end of a rod 152, which is drawn upon by means of a spring 153. Thus when the wheel Q is turned to bear upon the roller 49 the cam portion thereof will be carried against the curved branch 151 under the tension of spring 153. The braking effect is thus produced in an obvious way.

Figure 3:
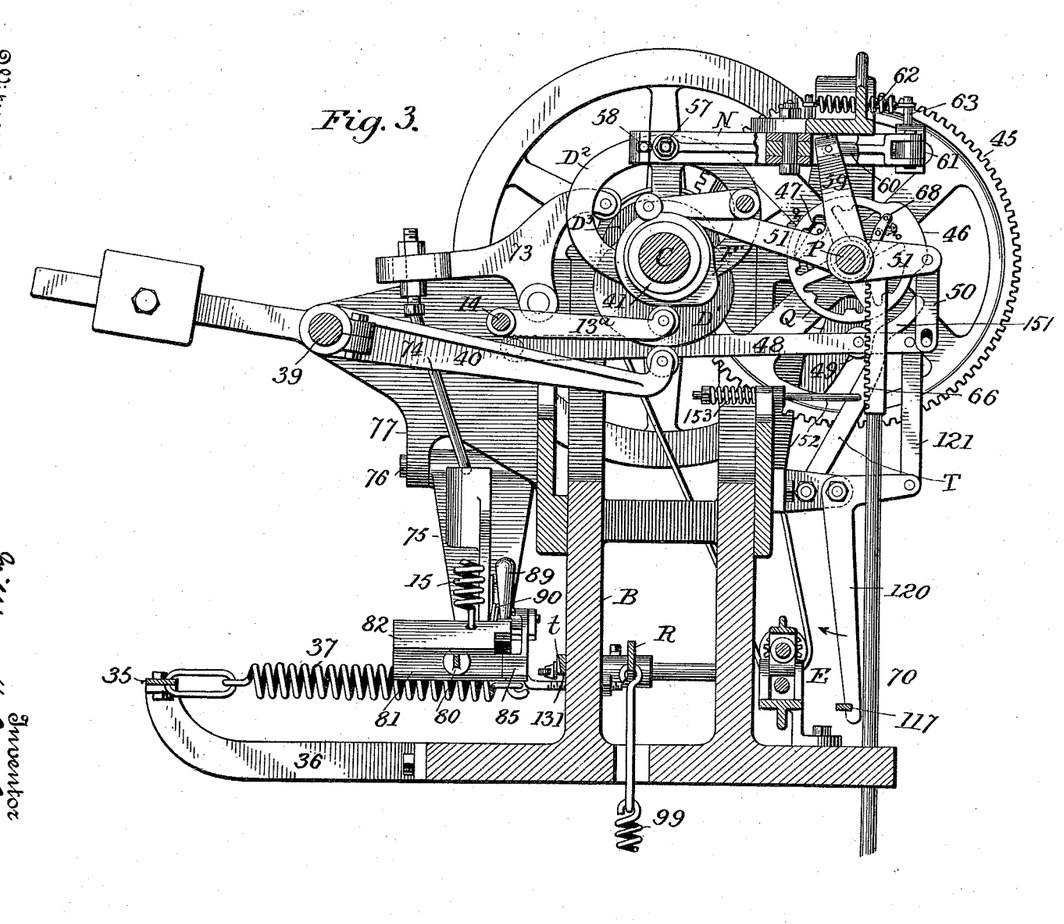
Fig. 3 is a vertical sectional elevation on the line 3 3, Fig. 1.
Figures 6, 7, 8:
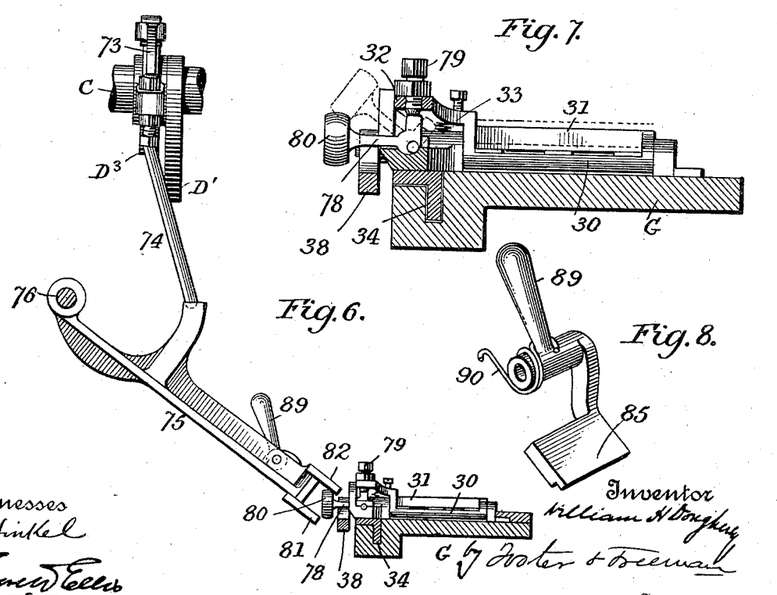
Fig. 6, a side view, in part section, on the line 6 6, looking in the direction of the arrow, Fig. 5.
Fig. 7 is an enlarged view of the gripper in, part section, showing the parts illustrated in Fig. 6.
Fig. 8 is a detached perspective view of part of the device for controlling the gripper.
Figure 9:
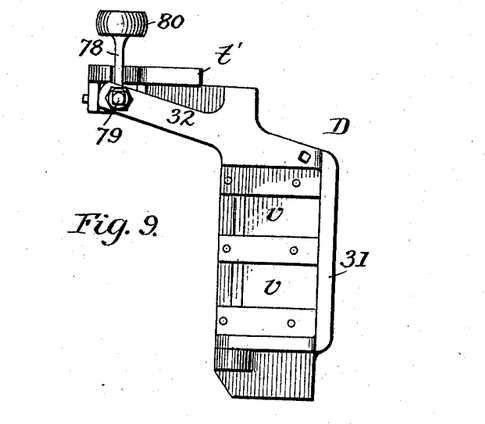
Fig. 9 is a plan of the gripper enlarged.
Figure 10:
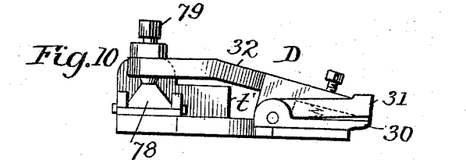
Fig. 10 is an edge view of the parts shown in Fig. 9.
Figure 11:
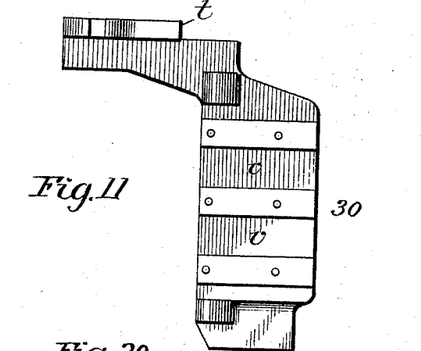
Fig. 11 is a plan of the lower gripper-jaw.

The gripper is opened and closed at the proper intervals from a cam D³ upon the shaft C, which cam operates a lever 73, connected by a rod 74, having a ball-and-socket connection with a lever 75, pivoted at 76 to the bracket 77 of the frame. An L-shaped lever 78 (see Fig. 7) is pivoted to the lower jaw of the gripper, its short arm engaging a set-screw 79, passing through the arm 32 of the upper jaw and its long arm carrying a roller 80, which extends between parallel blades 81 82. A spring 15 tends to lift the lever 75 and cause the lower blade 81 to bear upon the roller 80 and carry the parts to the position shown in dotted lines, Fig. 7, when the short arm of the lever 7 will be carried from below the screw 79 and the spring 33 arranged between the gripper-jaws will open them. When the cam D³ rocks back the lever 73 and depresses the lever 75, the upper blade 82, bearing on the roller 80, will bring the short arm of the lever 78 beneath the screw 79 and close the jaws. As the gripper moves back and forth the parts will be maintained in position by the contact of the roller 80 with the blade. If it is desired to open the jaws by hand at any time, this may be effected when the roller 80 is in its forward position by swinging a section 85 of the lower blade 81, (see Figs. 3 and 8,) which section is pivoted to the side of the lever 75 and is provided with a handle 89 and closing-spring 90. The upper blade 82 is cut away above the section 85, so that when the latter is lifted to swing the lever 78 to the position shown in dotted lines, Fig. 7, the roller 80 may pass upward through the cutaway portion and the jaws can be opened.

Owing to reasons before set forth, which result in varying distances between the prints, it is very desirable that the operator shall be able to change the degree of feed from time to time without interfering with the operations or adjustment of the machine, and I therefore provide means for changing the extent of movement of the grippers. Thus the link 38 is pivoted to a slide 92, which may be moved up and down in a slot of the lever M by means of a screw 93, and the latter may be turned by turning a shaft 94, provided with a knob 95 and connected by a universal joint with the screw. The knob 95 may be readily turned by the operator to raise or lower the slide 92 and thereby varying the extent of reciprocation of the gripper.

An arm R extends over the die B at one side of the opening therein and is drawn downward by a spring 99 and when depressed serves to hold the strip close upon the die as the punch descends. A cam R' upon the shaft C, operating upon a lever 100, connected by a rod 101 with the arm R, serves to raise the latter. The pressure of the arm R also serves to hold the strip in position while the gripper goes back. To the shaft 14, supporting the crank-lever 13, is hung loosely a rod or bar 102, to the lower end of which is connected a bar 103, the forward end of which extends through a slot in the arm R, while the rear end of which extends in proximity to the pin 28 of the lever 27. A finger 104 at the end of the rod 102 is in such position that when the gripper moves beyond its short stroke it will make contact with the finger 104, swing the rod 102 and the bar 103 to the rear, and carry the bar 103 to a position over the pin 28. As a result, when the cam R' lifts the arm R and the forward end of the lever 103 the rear end of the latter is depressed and carries the lever 27 to its position shown in Fig. 13.

Figure 1:
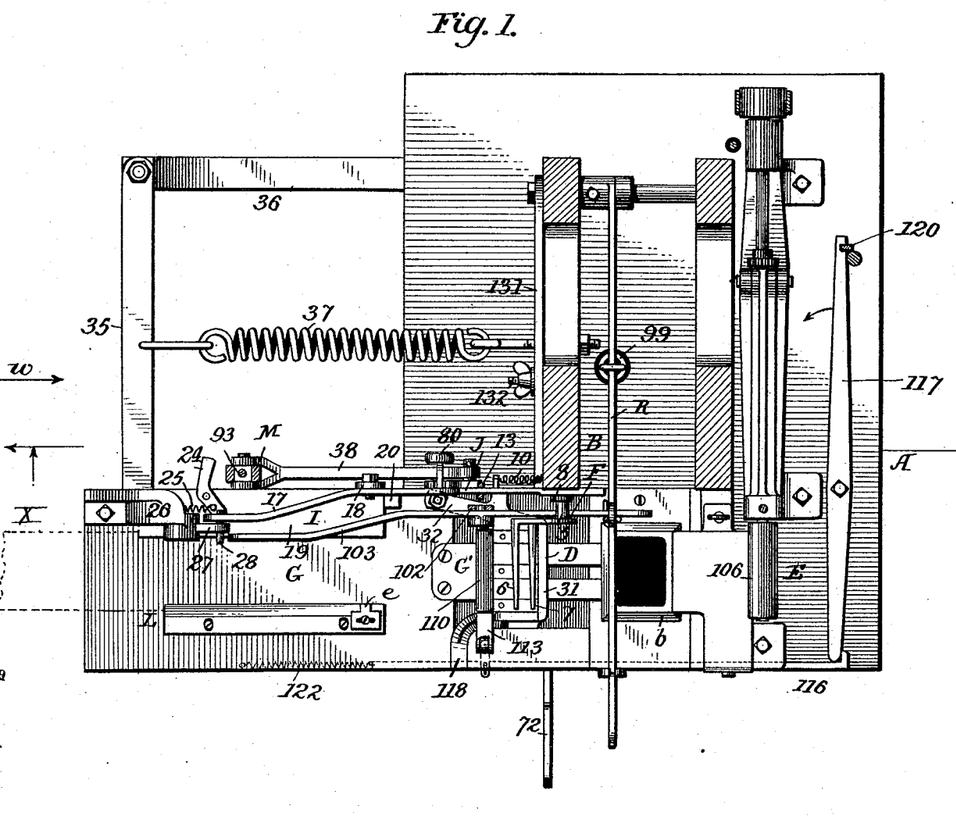
Figure 1 is a sectional plan of a punching-machine with my improvements.
Figure 2:
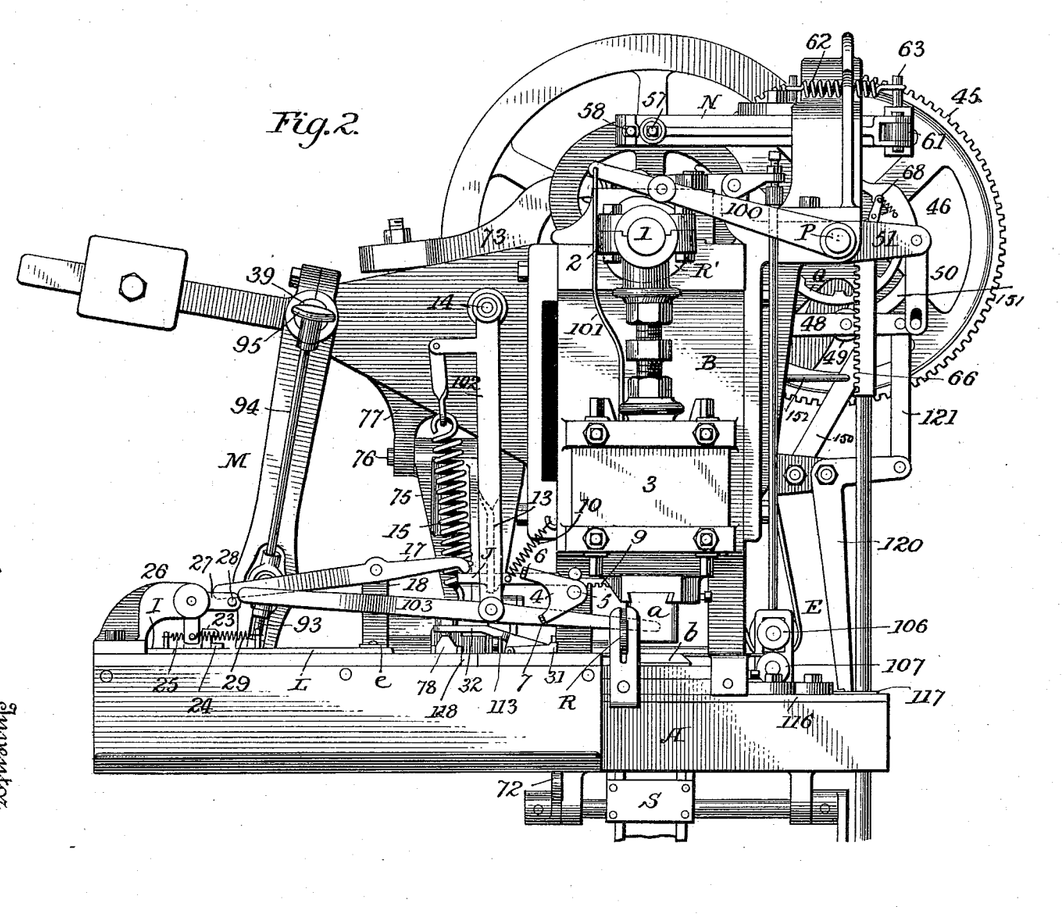
Fig. 2 is a front elevation.

*The auxiliary-discharge feed.*—The auxiliary-discharge feed E, as shown, consists of two rollers 106 and 107, Figs. 1 and 2. Inasmuch as I make no claim to this feature, which is common in punching devices for discharging scraps, the same need not be more fully described.

*Auxiliary clamp.*—It is desirable to have a clamping device that will hold the forward end of the strip in contact with the table as the strip travels forward. To this end I provide an auxiliary clamp consisting of a horizontal roller 110, which turns upon a rod 112, extending from a block 113 at the upper end of a shaft 114. An arm 115, extending from said shaft, is connected by a rod 116 with a lever 117, pivoted to the base-plate A. The block 113 has an inclined cam-face adapted to a similar face on a hub 118 upon the base-plate, so that when the shaft 114 is turned to carry the roller 110 over the strip the block and the roller together will descend and bring the roller to bear upon the strip. When the shaft 114 is turned in the opposite direction, the roller will not only be turned to one side, but will be elevated away from the strip. These operations are effected automatically to swing the supplemental clamp out of the way when the gripper passes back to effect the long feed. Thus the lever 117 is rocked in the direction of its arrow, Fig. 1, by the movement of a lever 120, which is connected by a rod 121 with the lever 48, so that when the latter is depressed as the parts are put in operation to impart the long feed to the gripper the lever 120 will be swung in the direction of its arrow, Fig. 3. The return movement is effected by means of a spring 122, connected to the end of the rod 116.

*Card-receiver.*—Below the die b is the usual card-receiver S, having a sliding bottom 125 for supporting the cards. Hitherto friction devices have been depended upon to support the bottom 125; but difficulties result from the gradual increase in the weight of the cards, so that a frictional resistance which is sufficient to regulate the movement of the bottom at the beginning of operations is not sufficient to support its load at the end of such operations. In order to secure a resistance which is proportionate to the load, I connect to the lower end of a bar 126, extending from the bottom 125, a cord s, which passes over a pulley 128, under a pulley 129, and over a pulley 130, and has attached at intervals a series of weights 131. As the cards accumulate upon the bottom 125 and the weight thereon increases and the bottom descends there is a gradually-increasing counterbalance as the weights 131$^a$ are successively lifted.

If desired, the extent to which the gripper moves forward may be regulated with extreme nicety by providing a stop against which the gripper abuts as it moves toward the die. Thus an arm 131, pivoted to the frame B, is provided with an inclined face t, and the gripper has a projection t' with a beveled face corresponding to that of the stop. By raising or lowering the stop the extent to which the gripper moves forward may be regulated to a thousandth of an inch. A nut 132 serves to secure the stop after adjustment.

While I have illustrated and described certain constructions of gripper, clamps, flipper and gage devices, and certain means for operating the same and for imparting different movements to the gripper, I wish it to be understood that these constitute only one embodiment of my invention, and that the said parts may be constructed and operated by devices of different character without departing from the main features of my invention.

Although I have referred to the gripper or feed device as having varying movements adapted to operate upon a strip upon which there are eight prints, it will be understood that I have done so only because this is a usual mode of printing with certain manufacturers, and where there are more or less prints upon the strip the action will vary accordingly. Further, while I have referred to my improvements in connection with a punch for punching cards from strips of paper, it will be evident that they may be used in many instances with embossing punches or dies for operating upon strips of metal or other material in the manufacture of different articles.

Without therefore limiting myself to the precise construction and arrangement of parts shown and described, I claim as my invention—

1. The combination with a reciprocating punch or die, of a feed device for feeding the material to the punch, a uniform distance for a number of times, means for varying the extent of the feeding movement at regular intervals, and means for supporting one strip above another and for releasing it prior to the extended movement of the feed, substantially as described.

2. The combination with a reciprocating punch, of a reciprocating feed provided with jaws for gripping the material on opposite sides of its central line, means for opening and closing the jaws, means for extending the movement of the feed at predetermined intervals, and means for supporting one strip above another and for releasing the upper strip prior to the extended movement of the feed, substantially as described.

3. The combination with a reciprocating punch and a shaft and connections for operating the punch from said shaft, and a reciprocating gripper, a cam upon said shaft and connections between the cam and the gripper for reciprocating the latter, and a second cam, and means for putting the same into operation at intervals with said connections, substantially as set forth.

4. The combination of the reciprocating punch, operating-shaft, reciprocating gripper, two cams upon said shaft, means for locking one of the cams to and unlocking it from the said shaft, and connections between the cams and the gripper, substantially as described.

5. The combination of the reciprocating punch reciprocating gripper or feed device provided with clamping-jaws, means for moving the gripper at each reciprocation of the punch, means for extending the said movement at intervals, means for opening and closing the jaws of the gripper by the operation of the machine, and means for supporting one strip above another and for releasing the upper strip prior to the extended movement of the feed, substantially as described.

6. The combination with the reciprocating gripper having clamping-jaws of a spring for separating the said jaws, a bell-crank lever having one arm connecting with an arm of the movable jaw, and another arm provided with a roller, a lever 75 having parallel blades between which the latter arm of the bell-crank lever extends, and means for vibrating the lever 75 to open and close the jaws, substantially as set forth.

7. The combination with the reciprocating punch, of reciprocating gripper and cams $D'$, $D^2$, and connections for operating the gripper, and means for throwing the cam $D^2$ into and out of operation, of a brake engaging the cam $D^2$, substantially as set forth.

8. The combination of the reciprocating punch, reciprocating feed device, operating-cams $D'$, $D^2$, and connections, brake N for engaging the cam $D^2$, and means for relieving the pressure of the brake when the cam $D^2$ is put in operation, substantially as set forth.

9. The combination of the reciprocating punch, reciprocating feed device, shaft C, cam $D'$ secured to said shaft, and cam $D^2$, and connections between said cams and the feed device, means for connecting the cam $D^2$ to and disconnecting it from the shaft C, a cam-wheel Q for operating said means at intervals, and means for rotating the cam-wheel to put it in operation whenever required, substantially as set forth.

10. The combination with a reciprocating punch and feed device for feeding strips of material thereto, and table for supporting said strips, of a flipper for supporting the forward end of one strip in position above the rear end of another while the latter is being operated upon, and means for moving the flipper at intervals to release the upper strip, substantially as set forth.

11. The combination with a reciprocating punch, table, and feed device, of a rocking flipper, and means for rocking the same to discharge the end of a strip therefrom onto a table, substantially as set forth.

12. The combination with a reciprocating punch, table, and feed device, of a flipper supported by a rock-shaft and provided with two parallel bars arranged at different distances from the center of the shaft, substantially as set forth.

13. The combination of a table, a reciprocating punch, reciprocating feed device, and a clamping device, means for moving the clamping device to clamp a strip to the table, a device for supporting one strip above another and for releasing the upper strip prior to the final stroke of the feed device on the lower strip, and appliances for locking said supporting and releasing device in operative position during the closed position of the clamp, and unlocking said device when the clamp is released, substantially as described.

14. The combination of the clamping device, a flipper, and means for operating the latter, and connections throwing the latter means out of operation when the clamping device is open, substantially as set forth.

15. The combination of the reciprocating punch, feed device, and means for reciprocating the latter in unison with the punch, and for varying the extent of the movement at intervals, and an auxiliary clamp device, and means for moving the same out of position when the feed device has its maximum movement, substantially as set forth.

In testimony whereof I have signed my name to this specification in the presence of two subscribing witnesses.

WILLIAM H. DOUGHERTY.

Witnesses:
CHARLES E. FOSTER,
HENRY J. GROSS.